(12) United States Patent
Young et al.

(10) Patent No.: US 11,809,152 B2
(45) Date of Patent: Nov. 7, 2023

(54) ELECTRONIC AIR PRESSURE INTERLOCK SWITCH

(71) Applicant: Ademco Inc., Golden Valley, MN (US)

(72) Inventors: Gregory Young, Blaine, MN (US); Adam Myre, Minnetonka, MN (US); Frederick Hazzard, Plymouth, MN (US)

(73) Assignee: Ademco Inc., Golden Valley, MN (US)

(*) Notice: Subject to any disclaimer, the term of this patent is extended or adjusted under 35 U.S.C. 154(b) by 0 days.

(21) Appl. No.: 17/664,181

(22) Filed: May 19, 2022

(65) Prior Publication Data

US 2022/0276626 A1 Sep. 1, 2022

Related U.S. Application Data

(63) Continuation of application No. 16/677,341, filed on Nov. 7, 2019, now Pat. No. 11,340,569.

(51) Int. Cl.
*G05B 19/042* (2006.01)
*F24D 19/10* (2006.01)

(52) U.S. Cl.
CPC ....... *G05B 19/042* (2013.01); *F24D 19/1084* (2013.01); *G05B 2219/2614* (2013.01)

(58) Field of Classification Search
CPC .......... G05B 19/042; G05B 2219/2614; F24D 19/1084
See application file for complete search history.

(56) References Cited

U.S. PATENT DOCUMENTS

| 4,842,510 | A | * | 6/1989 | Grunden | F23N 5/203 |
| | | | | | 431/31 |
| 5,524,556 | A | * | 6/1996 | Rowlette | F23N 1/062 |
| | | | | | 110/162 |

(Continued)

OTHER PUBLICATIONS

"Power Vented Gas Water Heaters—Installation and Operating Manual," accessed from https://www.statewaterheaters.com/lit/im/res-gas/100293470.pdf, 2018, 56 pp. (Applicant points out, in accordance with MPEP 609.04(a), that the year of publication, 2018, is sufficiently earlier than the effective U.S. filing date, so that the particular month of publication is not in issue.).

(Continued)

*Primary Examiner* — Ramesh B Patel

(74) *Attorney, Agent, or Firm* — Greenberg Traurig, LLP; Ryan D. Sharp; David J. Dykeman

(57) ABSTRACT

A device that includes a pressure sensor that adds dynamic pressure sensing capability to a furnace. In some examples the device may include a relay and other circuitry to replace the single-setpoint pressure switch used to sense the operation of an inducer fan. The pressure sensor may measure the pressure from the inducer fan and send a signal to the other circuitry, such as a microcontroller. The other circuitry may determine when the pressure from the inducer fan reaches a predetermined threshold and allow the main gas valve of the furnace to open. The other circuitry may be configured to set the pressure sensor to a variety of predetermined pressure thresholds, and thereby replace multiple pressure switches. In some examples, the other circuitry may record pressure values received from the pressure sensor over time and provide performance data, as well as other signals or indicators.

20 Claims, 8 Drawing Sheets

(56) References Cited

U.S. PATENT DOCUMENTS

| | | | | |
|---|---|---|---|---|
| 9,261,277 B2* | 2/2016 | Hugghins | ............... | F23N 5/242 |
| 9,846,440 B2* | 12/2017 | Endel | ..................... | F23N 5/003 |
| 10,697,632 B2* | 6/2020 | Kucera | ............... | F16K 37/0083 |
| 10,851,993 B2* | 12/2020 | Kucera | .................. | F23N 1/002 |
| 11,340,569 B2* | 5/2022 | Young | ................ | F24D 19/1084 |
| 2005/0046584 A1* | 3/2005 | Breed | ............... | B60R 21/01542 |
| | | | | 340/13.31 |
| 2005/0162109 A1* | 7/2005 | Randals | ................... | F23N 5/00 |
| | | | | 318/269 |
| 2010/0291451 A1* | 11/2010 | Tamura | ............. | H01M 8/04228 |
| | | | | 429/429 |
| 2011/0174471 A1* | 7/2011 | Paller | ...................... | F23D 14/34 |
| | | | | 165/173 |
| 2013/0042851 A1* | 2/2013 | Garloch | ................... | F24H 9/20 |
| | | | | 126/112 |
| 2017/0336091 A1* | 11/2017 | Arensmeier | ....... | G05B 23/0286 |
| 2018/0215632 A1* | 8/2018 | Curlett | .................. | B01D 5/006 |
| 2020/0103105 A1* | 4/2020 | Cadima | .................. | F23N 1/022 |
| 2020/0348087 A1* | 11/2020 | Wilson | .................... | F24F 11/72 |
| 2021/0140650 A1* | 5/2021 | Wilson | ............... | F24D 19/1084 |
| 2021/0141352 A1 | 5/2021 | Young et al. | | |
| 2023/0052253 A1* | 2/2023 | Curlett | ................ | B01D 1/0082 |

OTHER PUBLICATIONS

Fasco, "Fasco W4 115-Volt 3300 RPM Furnace Draft Inducer Blower," SCOUT, retrieved on Sep. 18, 2018, 13 pp.
Prosecution History from U.S. Appl. No. 16/677,341, dated Sep. 27, 2021 through Apr. 27, 2022, 36 pp.

* cited by examiner

ELECTRONIC AIR PRESSURE INTERLOCK SWITCH

This application is a continuation of U.S. patent application Ser. No. 16/677,341, which was filed on Nov. 7, 2019, now U.S. Pat. No. 11,340,569, and is entitled, "ELECTRONIC AIR PRESSURE INTERLOCK SWITCH," the entire content of which is incorporated herein by reference.

TECHNICAL FIELD

This disclosure describes techniques related to gas-fired heating systems, such as heating, ventilation, and air conditioning (HVAC) systems and water heaters.

BACKGROUND

Some heating, ventilation and air conditioning (HVAC) systems that include a gas furnace may use at least one pressure switch to prove that the combustion blower is running before allowing the main control circuit to open the main gas valve. The pressure switch is wired in series with the main gas valve drive relay on the integrated furnace control (IFC). When the pressure switch senses an air pressure above a threshold, the pressure switch closes a circuit to allow the IFC signal to pass and open the main gas valve. If the combustion blower is stopped, or not providing enough combustion air, the pressure switch prevents the signal from reaching the main gas valve to allow gas to flow. In these systems, the pressure switch may be considered as the redundant contact for safety analysis. In the example of a two stage and modulating systems furnace may require multiple pressure switches set to different fan pressures.

SUMMARY

In general, this disclosure is directed to a device that adds pressure sensing capability to a furnace. The device may include a pressure sensor, a relay and other circuitry to replace the single-setpoint pressure switch used to sense the operation of an inducer fan, which may also be called an inducer blower or combustion blower. The pressure sensor is configured to be in pneumatic communication with the inducer fan pressure and in electrical connection with the other circuitry, such as a microcontroller. The pressure sensor may measure the pressure from the inducer fan and send a signal to the other circuitry. The other circuitry may determine when the pressure from the inducer fan reaches a predetermined threshold and operate a relay, or other switch, to allow the main gas valve to open. The other circuitry may be configured to set the pressure sensor to a variety of predetermined pressure thresholds. In the example of a multi-stage furnace, the single pressure sensor may be configured to sense more than one predetermined threshold and thereby replace multiple pressure switches. In some examples, the other circuitry may record pressure values received from the pressure sensor over time and provide performance data, as well as other signals or indicators.

In one example, this disclosure is directed to a method comprising: receiving, by processing circuitry, a signal from a pressure sensor, wherein the pressure sensor is in pneumatic communication with a pressure output of an inducer fan, and wherein the signal from the pressure sensor is proportional the pressure output of the inducer fan; determining, by the processing circuitry, the magnitude of pressure output from the inducer fan based on the received signal from the pressure sensor; determining, by the processing circuitry, the operating state of the inducer fan based on the determined magnitude of pressure; storing, by the processing circuitry, data corresponding to the determined magnitude of pressure; in response to the magnitude of pressure satisfying a pressure threshold, outputting, a switch control signal, wherein the switch control signal closes a circuit allowing a gas valve to open.

In another example, this disclosure is directed to a device comprising: a pressure sensor in pneumatic communication with a pressure output of an inducer fan, wherein the pressure sensor is configured to output a signal proportional the pressure output of the inducer fan; processing circuitry in signal communication with the pressure sensor, herein the processing circuitry is configured to: receive the signal from the pressure sensor; determine the pressure output of the inducer fan; determine the state of the inducer fan based on the signal from the pressure sensor; in response to the pressure output satisfying a pressure threshold, output a switch control signal, wherein the switch control signal closes a circuit allowing a gas valve to open; store data of the pressure output of the inducer fan at a memory location.

In another example, this disclosure is directed to a system comprising: an inducer fan configured to provide combustion air to a combustion chamber; a pressure sensor in fluid communication with the combustion air and configured to measure the pressure of the combustion air and to output a signal proportional the measured pressure; processing circuitry in signal communication with the pressure sensor, wherein the processing circuitry is configured to: receive the signal from the pressure sensor; determine the pressure output of the inducer fan; determine the state of the inducer fan based on the signal from the pressure sensor; in response to the pressure output satisfying a pressure threshold, output a switch control signal, wherein the switch control signal closes a circuit allowing a gas valve to open; store data of the pressure output of the inducer fan at a memory location.

The details of one or more examples of this disclosure are set forth in the accompanying drawings and the description below. Other features, objects, and advantages of the disclosure will be apparent from the description and drawings, and from the claims.

DETAILED DESCRIPTION

Figure 1:
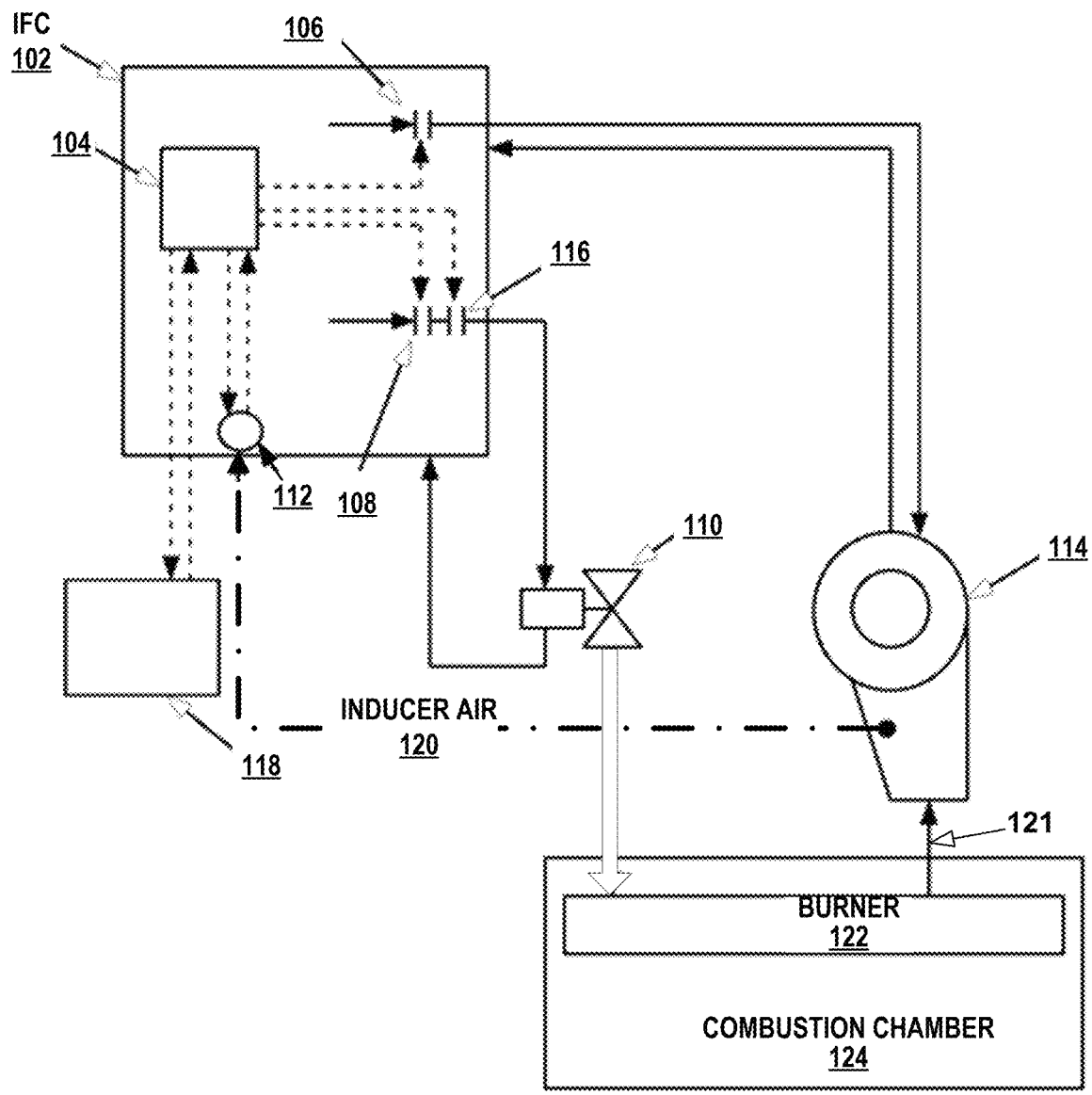
FIG. 1 is a block diagram illustrating a pressure sensor mounted on an integrated furnace control (IFC) in according to one or more techniques of this disclosure.

To ensure safe operation of a gas furnace, the furnace may include a means to ensure the inducer fan is properly operating before opening a main gas valve and igniting the gas. This disclosure is directed to a device that adds pressure sensing capability to a furnace, a boiler or any other combustion system that uses an inducer fan, in which the system senses that the inducer fan is providing sufficient pressure. The device may include a pressure sensor, a switching device, such as a relay and other circuitry to replace the single-setpoint pressure switch used to sense the operation of the inducer fan. The pressure sensor is configured to be in pneumatic communication with the inducer fan pressure and in electrical connection with the other circuitry, which may include a microcontroller, a relay, relay drive circuitry, communication circuitry and other functions. The pressure sensor may measure the pressure from the inducer fan and send an analog or digital signal to the other circuitry. The other circuitry may determine whether the inducer fan is running and in some examples in which state the inducer fan is operating (e.g. high speed, low speed, etc.). When the pressure from the inducer fan reaches a predetermined threshold, the other circuitry may cause a relay, or other switch, to allow the main gas valve to open. The other circuitry may be configured to set the pressure sensor to a variety of predetermined pressure thresholds. In the example of a multi-stage furnace, the single pressure sensor may be configured to sense more than one predetermined threshold and thereby replace multiple pressure switches. In some examples, the other circuitry may record pressure values received from the pressure sensor over time and provide performance data, as well as other signals or indicators.

The pressure sensing device of this disclosure may be implemented in a variety of configurations. In some examples, the pressure sensor, processing circuitry, relay, relay drive circuitry and so on are combined in a single device that may be added to an existing integrated furnace controller (IFC), which may be configured to operate with a single-setpoint pressure switch. The processing circuitry on the device may be configured to close the relay on the device at the same predetermined threshold as the single-setpoint pressure switch to be replaced. In this manner, the device may replace the single-setpoint pressure switch without the need to replace or reconfigure the existing IFC.

In other examples the device may be integrated into an IFC. In other words, the pressure sensor, relay, and other circuitry may be part of an IFC installed in a furnace. The integrated IFC may be configured to allow the main gas valve to open based on variety of pressure thresholds, or to multiple thresholds in the example of a multi-stage or modulating furnace systems.

In other examples, the device may be configured to operate with a gas water heater, or for a boiler. As with the furnace example above, the pressure sensor and other circuitry may be integrated into water heater module control board or may be configured as a stand-alone device that connects to an existing water heater module control unit configured to operate with a pressure switch.

FIG. 1 is a block diagram illustrating a pressure sensor mounted on an IFC in according to one or more techniques of this disclosure. The example of FIG. 1 is directed to a forced air furnace, but a similar configuration may be applied to other gas fired appliances, such as a boiler, which may supply hot water for radiant heat flooring, baseboard radiators and similar equipment.

The example of FIG. 1 depicts IFC 102 that controls the operation of inducer fan 114 and gas valve 110 as well as receives a pneumatic signal from inducer fan 114. Gas valve 110 controls the flow of combustible gas to burner 122 in combustion chamber 124. Human-machine interface (HMI) 118 may communicate with microcontroller 104 on IFC 102 to monitor operation or control settings for IFC 102.

Examples of processing circuitry in this disclosure, such as microcontroller 104, may include any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Inducer fan 114, which may also be called an inducer blower or combustion blower, provides combustion air to burner 122 within combustion chamber 124. In some examples inducer fan 114 may draw combustion air from the space surrounding a furnace, boiler, or similar appliance. In other examples inducer fan 114 may draw combustion air via a pipe from air outside a structure that includes the furnace. By monitoring the pressure at the outlet of inducer fan 114, microcontroller 104 may determine whether inducer fan 114 provides sufficient air flow 121 to burner 122. In the example of FIG. 1, microcontroller starts inducer fan 114 by closing inducer fan relay 106. In some examples, microcontroller 104 may also configure inducer fan 114 to run at different speeds by, for example, controlling the magnitude of voltage or current, the frequency, or closing additional relays (not shown in FIG. 1) that control the number of active windings within inducer fan 114.

Gas valve 110 may also be referred to as a main gas valve. In some examples the furnace may include a pilot valve in addition to the main gas valve. In other examples the furnace may include an automatic igniter rather than a pilot valve. In the example of FIG. 1, the operation of gas valve 110 is controlled by main valve relay 108 in response to a signal from microcontroller 104. In some examples gas valve 110 may be a solenoid operated valve. As a safety feature, the signal from main valve relay 108 may also pass through pressure relay 116 before the signal reaches gas valve 110.

Microcontroller 104 may only close pressure relay 116 after determining whether inducer fan 114 is providing sufficient air flow for safe functioning of burner 122. Microcontroller 104 may receive an electronic signal from pressure sensor 112 which in turn receives a pneumatic signal via inducer air 120. The pneumatic signal, i.e. inducer air 120, may be implemented, for example by tubing running from the outlet of inducer fan 114 to put pressure sensor 112 in pneumatic communication with the pressure output of inducer fan 114.

Unlike a pressure switch, pressure sensor 112 is configured to output a signal proportional the pressure output of inducer fan 114. Microcontroller 104 may close pressure relay 116 when the electronic signal from pressure sensor 112 indicates that the pressure output from inducer fan 114 exceeds a threshold. Microcontroller 104 may determine the state of inducer fan 114 based on the signal from the pressure sensor, e.g. ON or OFF, high, medium or low output setting, and so on. In response to the signal from pressure sensor 112 indicating the pressure output from inducer fan 114 satisfies a pressure threshold, microcontroller 104 may output a switch control signal to both main valve relay 108 and pressure relay 116. The switch control signal closes the relays and completes the circuit allowing gas valve 110 to open. In some examples, microcontroller 104 may signal main valve relay 108 to close when microcontroller 104 receives a signal indicating a call for heat. Microcontroller 104 may wait to close pressure relay 116 until the signal from pressure sensor 112 indicates sufficient air pressure at the pressure outlet, and thus sufficient air flow from inducer fan 114.

In the example of a multi-stage or modulating furnace system, IFC 102 may be configured to allow the main gas valve to open based multiple thresholds, rather than requiring several pressure switches. The dynamic range of pressure sensor 112 is capable of sensing the various pressures produced at different fan speeds. Therefore microcontroller 104 need not calculate, estimate, or infer the other fan speeds based on a pressure triggering a single point pressure switch input.

Also, an HVAC technician may only need to carry a single model of IFC 102 to configure a furnace for a variety of situations, rather than carrying multiple pressure switches, which are manufactured to multiple pressure settings. An IFC configured according to the techniques of this disclosure may provide a further advantage by monitoring the performance of inducer fan 114 over time and operating conditions. Microcontroller 104 may store data over time of the dynamic values of pressure output of inducer fan 114 at a memory location, such as a memory location that is part of IFC 102. Collecting and storing dynamic pressure values may provide better diagnostics when compared to collecting and storing whether or not the outlet pressure trips a pressure switch. In some examples, microcontroller 104 may output performance, diagnostic and preventative maintenance information based on the stored data. In other examples, microcontroller 104 may output pressure data, such as to HMI 118, and HMI 118, or a remote server connected to a network, may determine furnace performance and diagnostics, such as efficiency, degraded performance, e.g. from worn fan bearings, a plugged or partially plugged flue, and similar diagnostics.

HMI 118 may be any variety of human-machine interface. In some examples, HMI 118 may be permanently connected to microcontroller 104, e.g. a control panel mounted to a furnace, or a control panel mounted, for example on a wall of a structure and remotely connected to microcontroller 104. In some examples HMI 118 may be hard wired to microcontroller 104 or wirelessly connected. In some examples, HMI 118 may include a computer, tablet, mobile phone or other device connected to microcontroller 104 via a network or similar connection. HMI 118 may receive diagnostic information and may be used to configure one or several setpoints for pressure thresholds for microcontroller 104 based on the signal received from pressure sensor 112.

Figure 2:
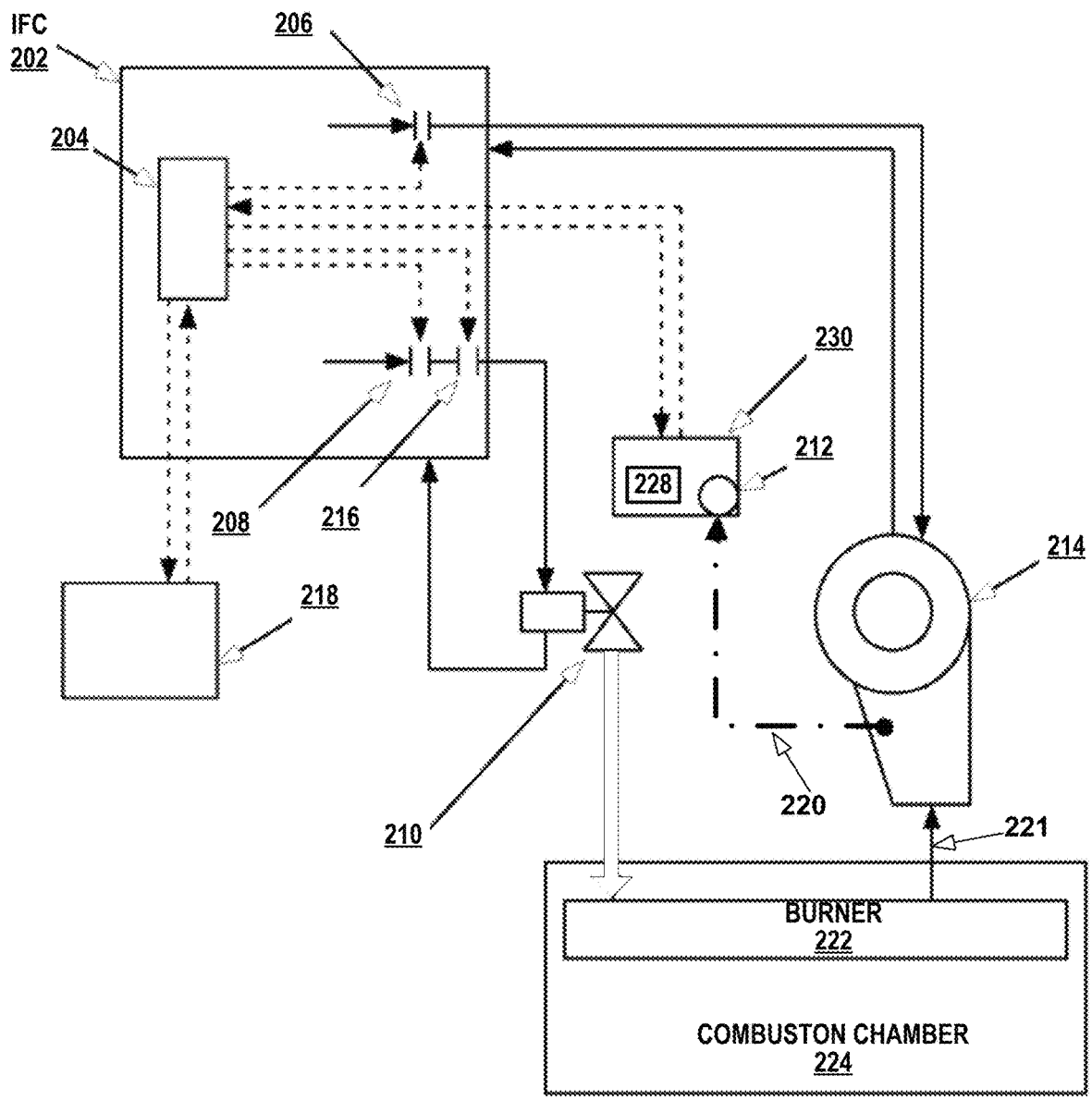
FIG. 2 is a block diagram illustrating a stand-alone pressure sensor module in according to one or more techniques of this disclosure.

FIG. 2 is a block diagram illustrating a stand-alone pressure sensor in according to one or more techniques of this disclosure. The example of FIG. 2 operates similar to the example of FIG. 1, described above. The stand-alone electronic pressure module 230 that includes pressure sensor 212 may be useful for applications in which an existing IFC, e.g. IFC 202 does not need to be replaced, but replacing a single-setpoint pressure switch with a pressure sensor capable of a dynamic range may be desirable.

The example of FIG. 2 includes IFC 202, inducer fan 214, combustion chamber 224, gas valve 210, and HMI 218, which are examples, of IFC 102, inducer fan 114, combustion chamber 124, gas valve 110, and HMI 118 described above in relation to FIG. 1. As such, the characteristics and functions of IFC 202, inducer fan 214, combustion chamber 224, gas valve 210, and HMI 218 are similar or the same as the characteristics and functions of IFC 102, inducer fan 114, combustion chamber 124, gas valve 110, and HMI 118 of FIG. 1. Similarly, the characteristics and functions of main valve relay 208, inducer fan relay 206, burner 222 are the same or similar to the characteristics and functions of main valve relay 108, inducer fan relay 106, and burner 122 of FIG. 1.

In the example of FIG. 2, pressure sensor 212 receives the pneumatic signal 220 from the pressure outlet of inducer fan 214 to determine sufficient air flow 221, as described above for pressure sensor 112 in relation to FIG. 1. Pressure sensor 212 is mounted on pressure module 230 instead of directly to IFC 102. Microcontroller 204 may be configured to receive an electronic signal from a single-setpoint pressure switch, which has been replace by pressure module 230. In some examples, pressure module 230 may include output circuitry configured to output a signal that mimics the output of a pressure switch, e.g. output a signal that indicates the outlet pressure exceeds a pressure threshold. Microcontroller 204 may have been configured to control pressure switch relay 216 based on receiving an output of a pressure switch. However, by receiving signals from pressure module 230, microcontroller 204 may control the operation of pressure switch relay 216 similar to the operation described for pressure relay 116 above in relation to FIG. 1. In some examples, pressure module 230 may include processing circuitry configurable to receive pressure setpoints from an input device, such as HMI 218. In other examples, pressure module 230 may include other techniques to establish pressure setpoints such as DIP switches, configurable logic, jumpers or similar techniques.

In other examples, pressure module 230 may also include processing circuitry 228 which may include a memory. Pressure module 230 may be configured to monitor and output performance data of inducer fan 214, including the dynamic pressure values determined by pressure sensor 212. In some examples, pressure module 230 may store the dynamic pressure values at a memory location within processing circuitry 228. In other examples, microcontroller 204 may also communicate with processing circuitry 228 and store the dynamic pressure values at a memory location. Either or both of pressure module 230 and microcontroller 204 may communicate with HMI 218, though communication between pressure module 230 and HMI 218 are not shown in FIG. 2. HMI 218 may collect performance data and configure one or several setpoints for pressure thresholds for microcontroller 204 and pressure module 230 based on the signal received from pressure sensor 212. In some examples, pressure module 230 may replace several single-setpoint pressure switches, such as in a multi-stage furnace.

Figure 3:
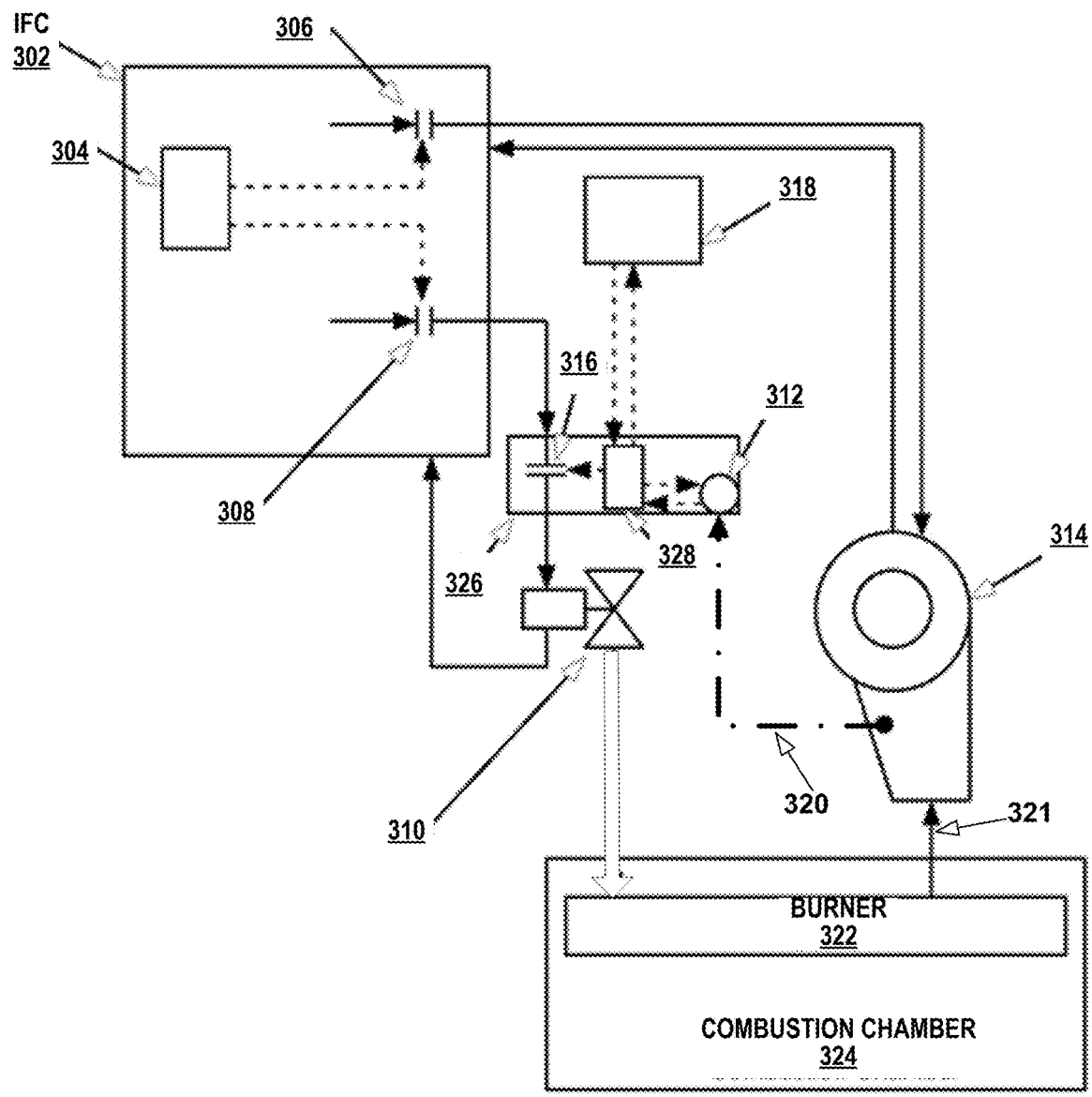
FIG. 3 is a block diagram illustrating an electronic pressure sensing module according to one or more techniques of this disclosure.

FIG. 3 is a block diagram illustrating an electronic pressure sensing module according to one or more techniques of this disclosure. IFC 302 in the example of FIG. 3 does not include a pressure relay, such as pressure relay 116. Instead, IFC 302 sends a signal to control to a pressure relay not mounted to IFC 302. Similar to the description of FIG. 2, electronic pressure module 326 may replace one or more single-setpoint pressure switches in an existing furnace, boiler or similar appliance.

The example of FIG. 2 includes IFC 302, inducer fan 314, combustion chamber 324, gas valve 310, and HMI 318, which are examples, of IFC 102, inducer fan 114, combustion chamber 124, gas valve 110, and HMI 118 described above in relation to FIG. 1. As such, the characteristics and functions of IFC 302, inducer fan 314, combustion chamber 324, gas valve 310, and HMI 318 are similar or the same as the characteristics and functions of IFC 102, inducer fan 114, combustion chamber 124, gas valve 110, and HMI 118 of FIG. 1, unless otherwise described below. Similarly, the characteristics and functions of main valve relay 308, inducer fan relay 306, burner 322 are the same or similar to the characteristics and functions of main valve relay 108, inducer fan relay 106, and burner 122 of FIG. 1.

Pressure module 326 may be useful when replacing an existing pressure switch, or pressure switches, in a furnace. In the example of FIG. 3, an HVAC technician may simply replace the pressure switch, or multiple pressure switches, with pressure module 326 by connecting the pneumatic line from the pressure outlet of inducer fan 314 to pressure module 326. Pressure switch 316 may be inserted between main valve relay 308 on IFC 302 and gas valve 310. In the example of FIG. 3, microcontroller 304 may not directly control the operation of pressure switch 316. Instead, microcontroller 328, included on pressure module 326, may receive one or more pressure threshold setpoints from an input device, such as HMI 318. Micro controller 328 may further communicate with HMI 318 to send or received other data or instructions, similar to processing circuitry 228 and HMI 218 described above in relation to FIG. 2. Pressure module 326 may determine the state of inducer fan 114 based on the signal from pressure sensor 312, e.g. ON or OFF, high or low output setting. In response to the pressure output measured by pressure sensor 312 satisfying a pressure threshold, microcontroller 328 may output a switch control signal to pressure switch 316. The switch control signal may include switch driving circuitry that closes a circuit allowing gas valve 310 to open. Switch driving circuitry may include an amplifier or other circuitry to, for example, drive a relay coil to close relay contacts. In other examples, the switch may be implemented by an electronic switch such as a transistor or similar electronic switch.

Figure 4:
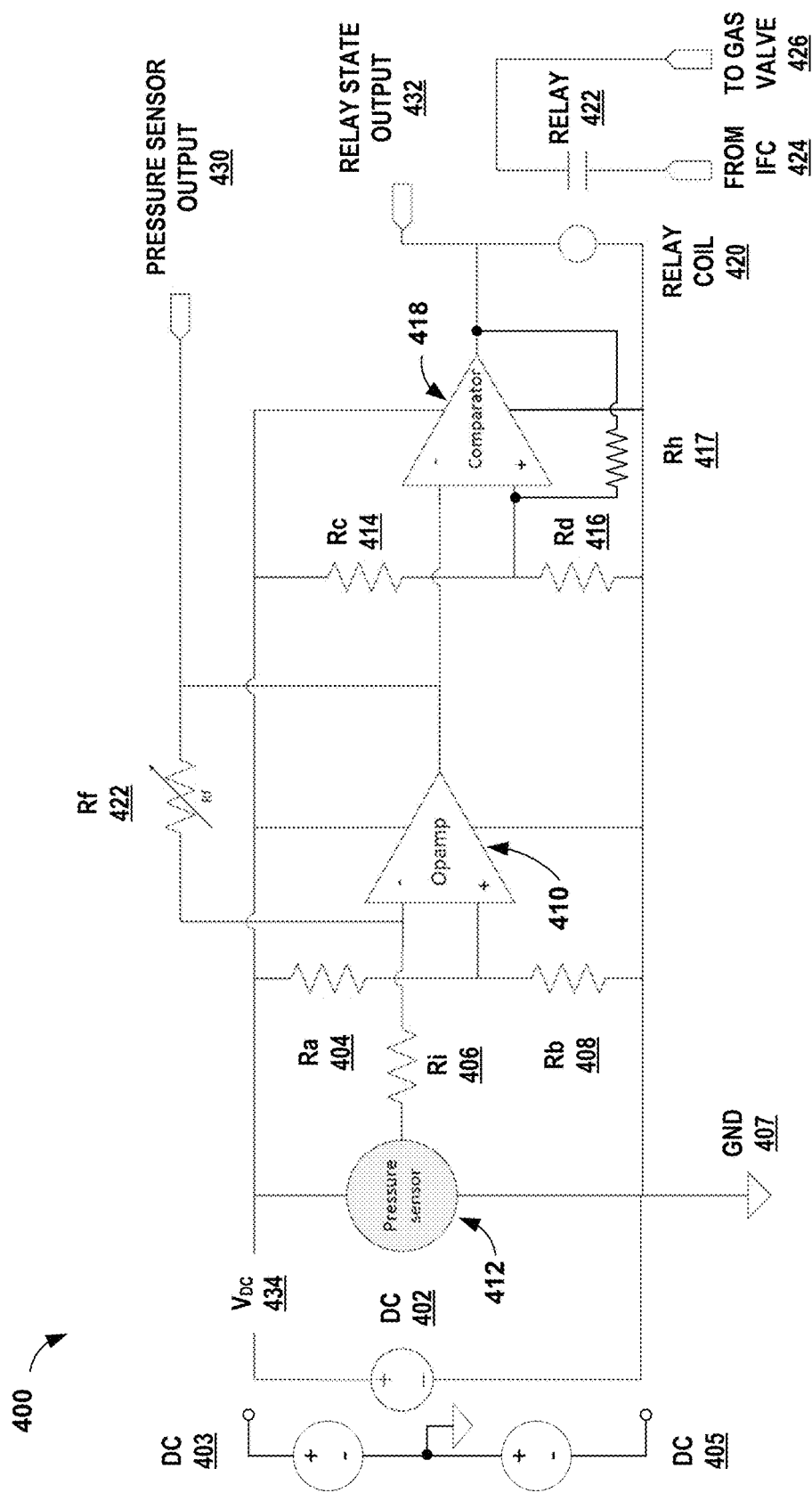
FIG. 4 is a schematic diagram illustrating an example implementation of electronic pressure sensing module in according to one or more techniques of this disclosure.

FIG. 4 is a schematic diagram illustrating an example implementation of electronic pressure sensing module in according to one or more techniques of this disclosure. Pressure sensing module 400 is an example of pressure module 326 described above in relation to FIG. 3, as well as an example of a pressure sensing circuit implemented on IFC 102 described above in relation to FIG. 1. Portions of pressure sensing module 400 may be implemented on pressure sensing module 230 described above in relation to FIG. 2.

The example of pressure sensing module 400 includes a connections to a DC power supply 402, pressure sensor 412, operational amplifier (opamp) 410, a resistor divider formed by Ra 404 and Rb 408 to set the bias voltage for opamp 410, a second resistor divider formed by Rc 414 and Rd 416 to set the threshold setpoint for comparator 418, relay coil 420, and relay contacts 422. Hysteresis resistor Rh 417 connects the output of comparator 418 to the non-inverting input of comparator 418. Pressure sensor 412 receives power from the positive voltage rail Vdc 434 and includes a ground connection (GND 407). The output of pressure sensor 412 connects to the inverting input of opamp 410 through input resistor 406. The combination of input resistor 406 and feedback resistor, Rf 422 set the gain for opamp 410. The non-inverting input of opamp 410 connects to the node between resistors Ra 404 and Rb 408. The series connection of resistors Ra 404 and Rb 408 connect positive voltage rail Vdc 434 to ground. Opamp 410 also may include a connection directly to Vdc 434 and a connection to ground. The output of opamp 410 connects to the inverting input of comparator 418, as well as provides an amplified signal proportional to the sensed pressure to pressure sensor output 430. In some examples, pressure sensor output 430 may connect to processing circuitry on an IFC, such as an analog-to-digital (ADC) input of microcontroller 104 on IFC 102 described above in relation to FIG. 1.

In some examples, DC power supply 402 may be replaced by power supplies 403 and 405. Power supplies 403 and 405 may connect to circuit 400 in a positive and negative supply configuration. The positive terminal of DC power supply 403 may connect to the positive voltage rail Vdc 434. The negative terminal of DC power supply 405 may connect to the ground rail and the ground connection 407 moved to the connection between the negative terminal of DC power supply 403 and the positive terminal of DC power supply 405. In other examples, DC power supply 402 may be configured as a negative power supply. That is, ground connection GND 407 may move to the positive voltage rail Vdc 434 (not shown in FIG. 4).

The series connection of resistors Rc 414 and Rd 416 connect positive voltage rail Vdc 434 to ground. The non-inverting input of comparator 418 connects to the node between resistors Rc 414 and Rd 416. The output of comparator 418 controls the current through relay coil 420, which in turn controls whether relay 422 is open or closed. The output of comparator 418 may also connect to relay state output 432. In some examples the resistors Rc 414 and Rd 416 may be implemented as a variable resistances, such as potentiometers, resistor networks controlled by jumpers, DIP switches, transistors or similar components or similar examples of a variable resistance. In some examples the value of resistors Rc 414 and Rd 416 may be controlled electronically, e.g. by controlling a set of electronic switches, such as transistors. In some examples, as with pressure sensor output 430, relay state output 432 may connect to processing circuitry. In the example of FIG. 4, comparator 418 may be considered one possible example of switch driving circuitry.

In operation, similar to described above in relation to FIGS. 1-3, pressure sensor 412 may receive a pneumatic signal indicating pressure, for example at a pressure outlet of an inducer fan. Pressure sensor may output a signal proportional to the sensed pressure, which is amplified by opamp 410. When the amplified signal from opamp 410 exceeds a pressure threshold setpoint, as set by resistor divider Rc 414 and Rd 416, comparator 418 toggles to a high state, which provides power to relay coil 420 and closes relay 422. This allows a signal to pass through relay 422, such a control signal to a gas valve, similar to the process for pressure relay 116 and gas valve 110 described above in relation to FIG. 1.

Figure 5:
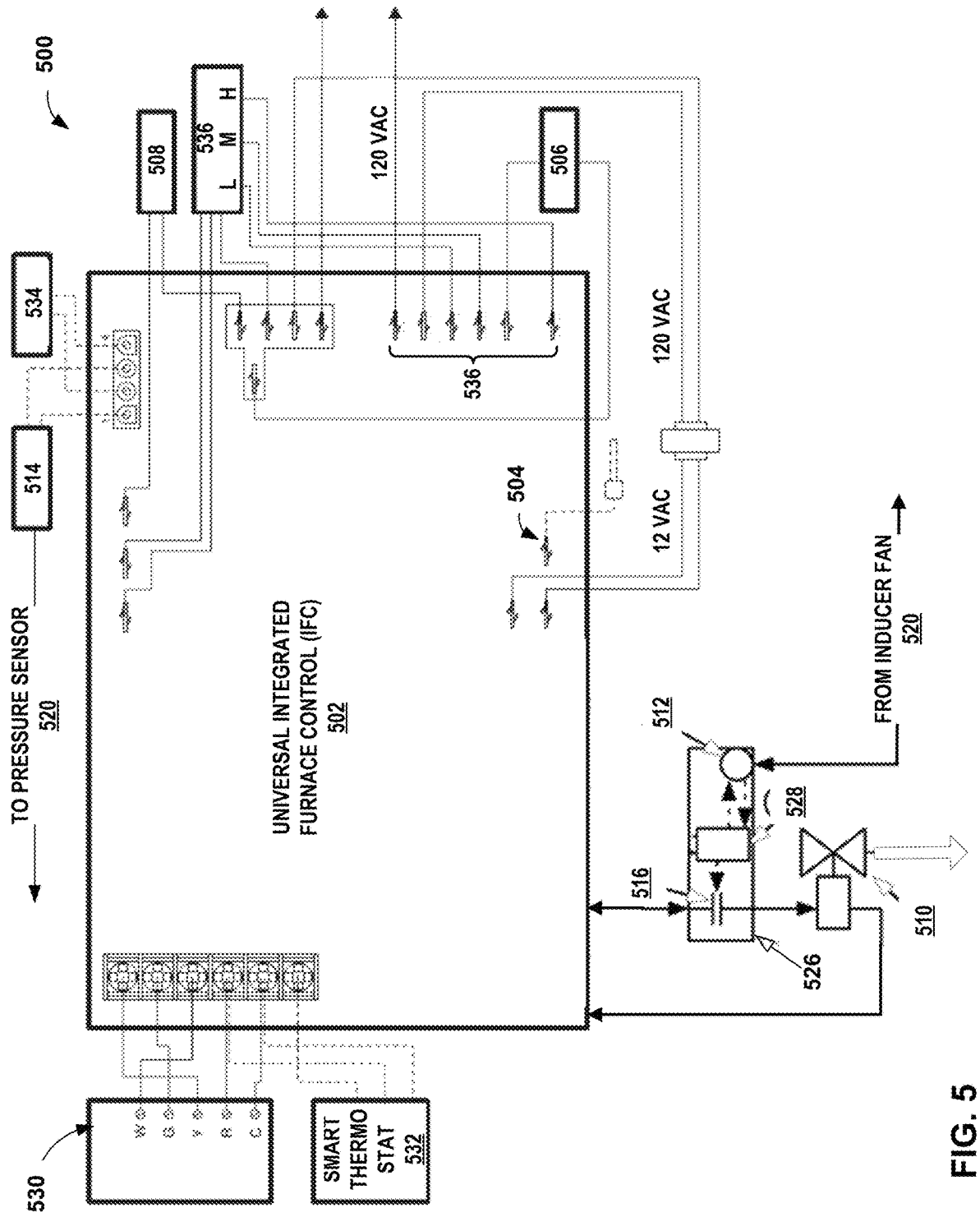
FIG. 5 is a block diagram illustrating furnace system with an IFC and pressure sensor module in according to one or more techniques of this disclosure.

FIG. 5 is a block diagram illustrating furnace system with an IFC and pressure sensor module in according to one or more techniques of this disclosure. Universal integrated furnace control board, IFC 502 and pressure module 526 are examples of IFC 302 and pressure module 326 described above in relation to FIG. 3. The example of FIG. 5 will be described in terms of a single stage furnace, but the techniques may be applied to other types of appliances.

The example of system 500, IFC 502 includes connections to equipment such as field wire connections 530 to an HVAC system, connections to thermostat 532, other connections 536 such as to circulation blower 536, connections to line power and to other equipment such as a humidifier 508, electronic air cleaner 506, an electronic igniter 534, or a flame sensor 504. In some examples, pressure module 526, which includes pressure switch relay 516, pressure sensor 512 and processing circuitry 528 in signal communication with pressure sensor 512 may be configured as a daughter board which is a circuit board that may be mounted on or near IFC 502 and be operatively coupled to IFC 502. In other words, the daughter board may electrically connect to IFC 502, which may include signal communication with IFC 502. In some examples the daughter board may also mechanically connect to IFC 502.

As described above in relation to FIG. 3, a signal controlling gas valve 510 may pass through pressure switch relay 516. Pressure sensor 512 may receive pressure information via a pneumatic connection 520 from inducer fan 514 and output a signal proportional to the sensed pressure. Processing circuitry 528 may determine whether the signal from pressure sensor 512 indicates that exceeds a pressure threshold. In response to determining that the pressure at the outlet of inducer fan 514 exceeds the pressure threshold, i.e. determining that inducer fan 514 is delivering sufficient air flow, processing circuitry 528 may energize pressure switch relay 516 to allow gas valve 510 to deliver flammable gas to a burner.

Data collected and stored by processing circuitry 528 may help track performance efficiency, as well as provide diagnostic data for preventative or corrective maintenance for system 500. In some examples, processing circuitry 528 may configured to establish communication with an input device, such as HMI 118 described above in relation to FIG. 1. Processing circuitry 528 may receive the setpoint for the pressure threshold from the input device. In some examples, processing circuitry 528 may receive configuration settings, such as pressure threshold setpoints, and output the diagnostic and preventative maintenance information via wireless communication.

Figure 6:
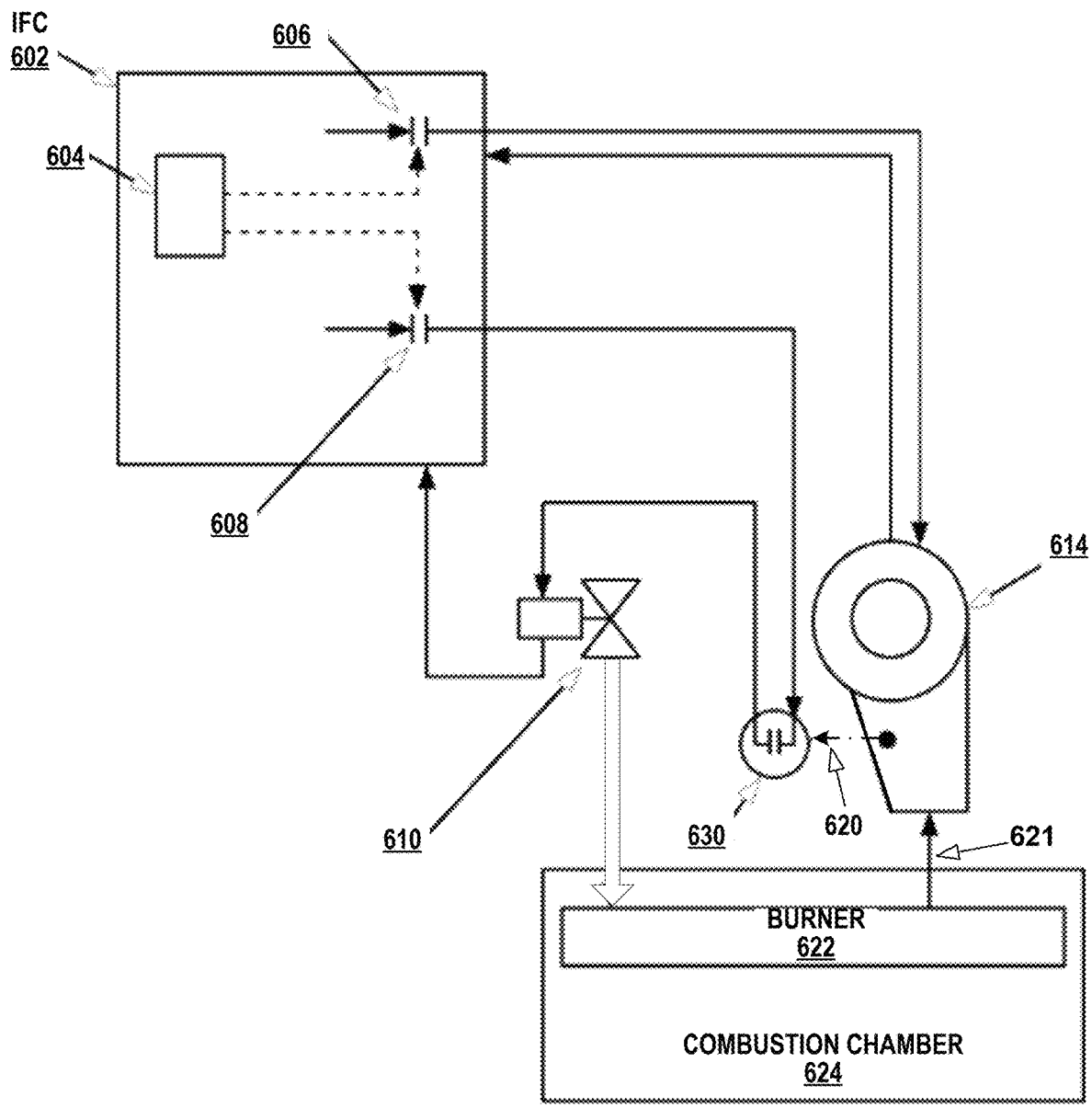
FIG. 6 is a block diagram illustrating an example pressure switch implementation.

FIG. 6 is a block diagram illustrating an example pressure switch implementation. The single-setpoint pressure switch 630 of FIG. 6 may be compared to the pressure sensor examples described above in relation to FIGS. 1-5.

The example of FIG. 6 includes IFC 602, inducer fan 614, combustion chamber 624, and gas valve 610, which are examples, of IFC 302, inducer fan 114, combustion chamber 124, and gas valve 110 described above in relation to FIGS. 1 and 3. As such, the characteristics and functions of IFC 602, inducer fan 614, combustion chamber 624, and gas valve 610 are similar or the same as the characteristics and functions of IFC 102, inducer fan 114, combustion chamber 124, and gas valve 110 of FIG. 1, unless otherwise described below. Similarly, the characteristics and functions of main valve relay 608, inducer fan relay 606, burner 622 are the same or similar to the characteristics and functions of main valve relay 108, inducer fan relay 106, and burner 122 of FIG. 1.

Similar to that described above in relation to FIGS. 3 and 5, a signal controlling gas valve 610 from IFC 602 may pass through pressure switch 630. Pressure switch 630 may include a pneumatic connection 620 to the pressure outlet of inducer fan 614. Pressure switch 630 may close the electrical connection between main valve relay 608 and gas valve 610 to allow gas valve 610 to provide combustible gas to burner 622.

The techniques of this disclosure described above in relation to FIGS. 1-5 may have several advantages over the arrangement depicted by FIG. 6. Some examples by include the ability to use a single pressure sensor module that may be configured for a variety of single stage and multi-stage furnaces. Also, a pressure sensor and processing circuitry described in FIGS. 1-5 may collect and store data that may be used for diagnostic and performance tracking functions.

Figure 7:
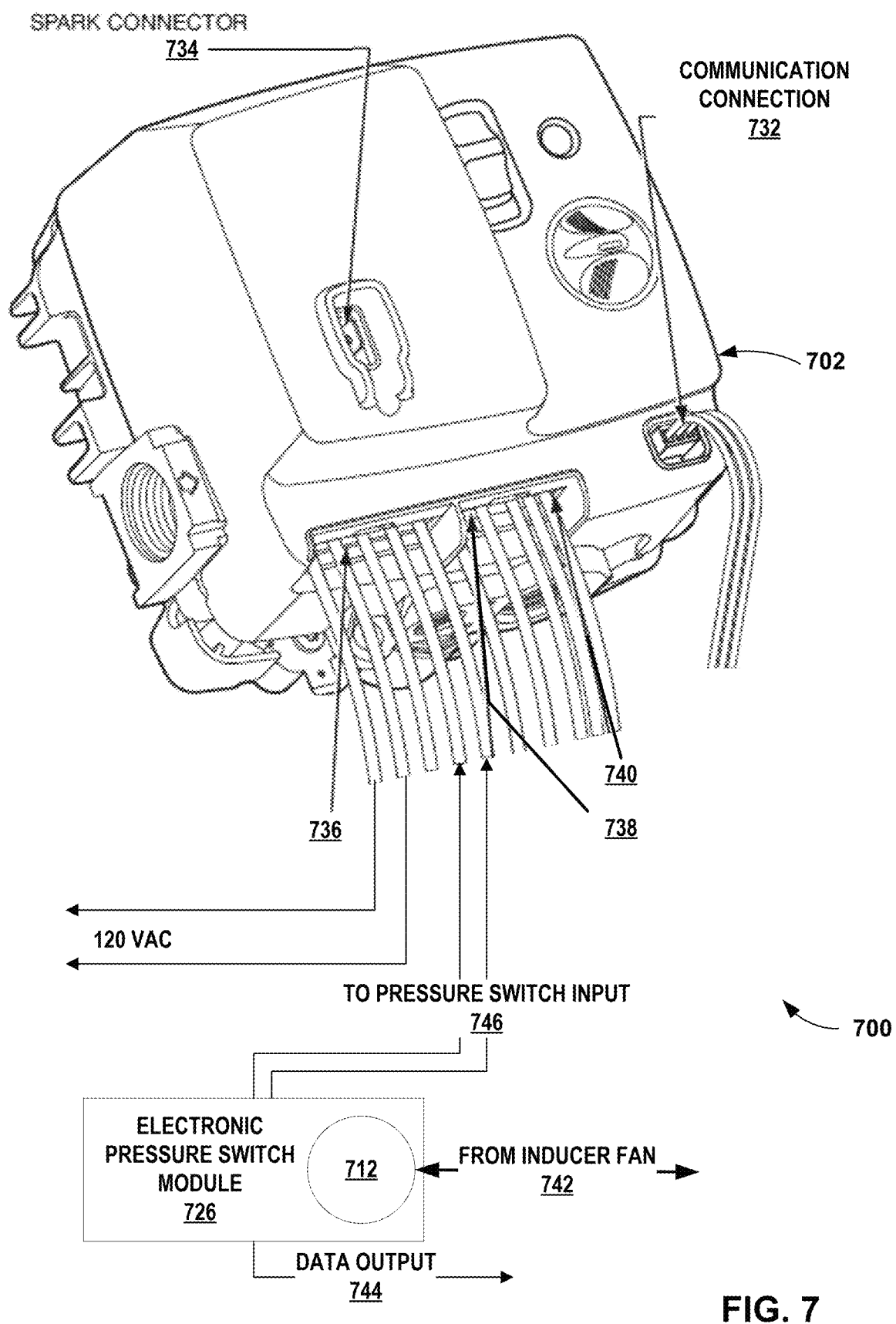
FIG. 7 is a block diagram illustrating an example water heater control module using a pressure sensor in according to one or more techniques of this disclosure.

FIG. 7 is a block diagram illustrating an example water heater control module using a pressure sensor in according to one or more techniques of this disclosure. Water heater control system 700 is an example similar to the furnace control systems depicted in FIGS. 1-3.

In the example of system 700, water heater control module 702 includes connectors 736, 738 and 740. Connector 736 includes connections for line power as well as to electronic pressure switch module 726. Connectors 738 and 740 may include connectors for other sensors such as a flame sensor, water pressure and temperature sensors and similar functions. Communication connection 732 may include connections to communicate with a computer network and publish status, alarms, and similar information to the network as well as receive queries and commands from the network. In some examples, spark connector 734 may command an ignitor device.

Electronic pressure switch module 726 is an example of pressure module 326 and 526 described above in relation to FIGS. 3 and 5 respectively. Pressure sensor 712 on pressure switch module 726 receives a pneumatic input from inducer fan 742 (not shown in FIG. 7). Pressure sensor 712 may send signals proportional the pressure output of inducer fan 742. Processing circuitry included in pressure switch module 726 may determine the magnitude of pressure output from the inducer fan based on the received signal from pressure sensor 712 and store pressure data corresponding to the determined magnitude of pressure at a memory location, for example a memory location within pressure switch module 726. In response to the magnitude of pressure from inducer fan 742 satisfying a pressure threshold, pressure switch module 726 may output a switch control signal that closes a circuit allowing a gas valve (not shown in FIG. 7) to open.

In some examples, pressure switch module 726 may output diagnostic data via data output 744, such as the pressure data stored at the memory location of pressure switch module 726. In some examples, pressure switch module 726 may output the diagnostic data in response to a query sent to water heater control module 702 via communication connection 732. In other examples, pressure switch module 726 may send data based on a periodic scheduled data transfer time.

Figure 8:
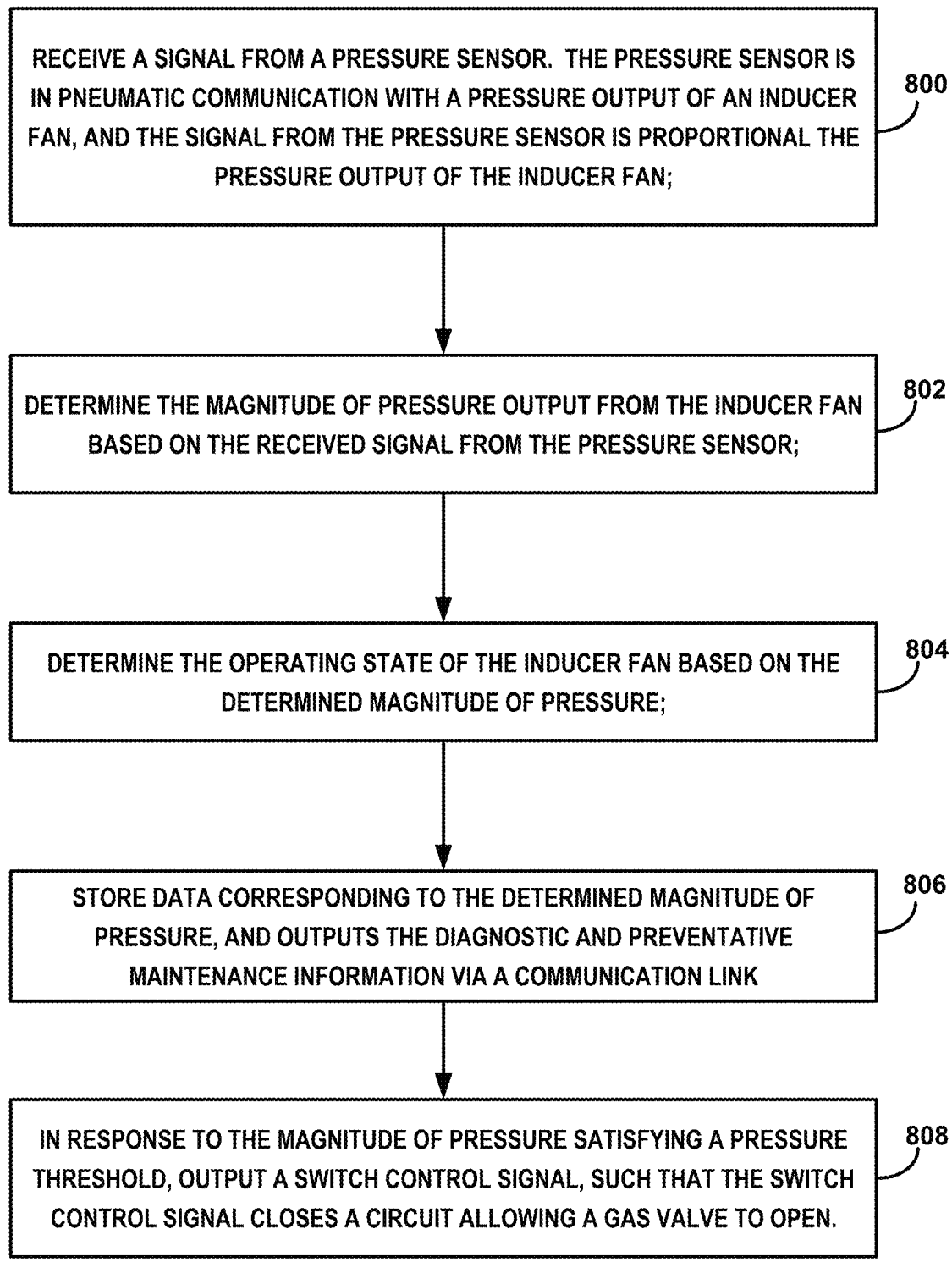
FIG. 8 is a flow diagram illustrating an example operation of the pressure switch module of this disclosure.

FIG. 8 is a flow diagram illustrating an example operation of the pressure switch module of this disclosure. The blocks of FIG. 8 will be described in terms of FIG. 3, unless otherwise noted.

Processing circuitry, such as microcontroller 328, may receive a signal from a pressure sensor, such as pressure sensor 312 (800). Pressure sensor 312, as shown in FIG. 3, is in pneumatic communication (320) with a pressure output of inducer fan 314. In some examples, the signal from the pressure sensor is proportional the pressure output of the inducer fan. In comparison, a pressure switch may also receive the pressure output of an inducer fan but may only open or close a circuit based on whether the pressure satisfies a threshold. A pressure switch would not output a signal in proportion to the dynamic changes in pressure.

Microcontroller 328 may determine the magnitude of pressure output from the inducer fan based on the received signal from the pressure sensor (802) as well as determine the operating state of the inducer fan based on the determined magnitude of pressure (804). Examples of operating state may include whether the fan is on, off, at high speed, low speed, or some other speed. Microcontroller 328 may also determine if there is some fault, for example a pressure that is excessively high may indicate a blocked flue, which may be caused by an animal that crawled into the flue, or some other blockage.

Microcontroller 328 may store data corresponding to the determined magnitude of pressure (806). In some examples, microcontroller 328 may output the stored data via a communication link, e.g. a wired connection such as USB, or a wireless link. In some examples microcontroller 328 may further process the raw pressure data and output diagnostic and preventative maintenance information based on the stored data.

In response to the magnitude of pressure satisfying a pressure threshold, microcontroller 328 may output a switch control signal that closes a circuit allowing a gas valve to open. For example, the switch control signal may close the contacts of a pressure relay that is include with pressure module 326. In other examples, the switch control signal may connect to a separate relay or to a second processor circuit to operate the pressure switch, such as described above in relation to FIG. 2.

In one or more examples, the functions described above may be implemented in hardware, software, firmware, or any combination thereof. FIGS. 1-5 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, or other computer readable media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processing circuitry" or "processor," as used herein, may refer to any of the foregoing structure or any other structure suitable for implementation of the techniques described herein. In addition, in some aspects, the functionality described herein may be provided within dedicated hardware and/or software modules configured for encoding and decoding, Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

Various examples of the disclosure have been described. These and other examples are within the scope of the following claims.

The invention claimed is:

1. A device comprising:
a pressure sensor configured to be in pneumatic communication with a pressure output of an inducer fan,
wherein the pressure sensor is configured to output a pressure signal indicating a dynamic range of pressure values of the pressure output of the inducer fan,
wherein the inducer fan is configured to provide combustion air to at least one of a combustion chamber of a furnace or a combustion chamber of a water heater or boiler; and processing circuitry in signal communication with the pressure sensor,
wherein the processing circuitry is configured to:
receive the pressure signal from the pressure sensor;
determine the pressure output of the inducer fan;
determine an operating state of the inducer fan based on the pressure signal from the pressure sensor; and
in response to determining the pressure output of the inducer fan, output a control signal to control operation of a respective one of the combustion chamber of the furnace or the combustion chamber of the water heater or boiler,
wherein to control the operation of the respective one of the combustion chamber of the furnace or the combustion chamber of the water heater or boiler, the control signal causes a gas valve to open.

2. The device of claim 1, wherein the processing circuitry is further configured to:
store data at a memory location, the data comprising the pressure output of the inducer fan, and
output diagnostic and preventative maintenance information based on the stored data.

3. The device of claim 2, wherein the pressure output of the inducer fan is based on a first speed of the inducer fan, and wherein to control the operation of the respective one of the combustion chamber of the furnace or the combustion chamber of the water heater or boiler, the control signal causes the inducer fan to run at a second speed different from the first speed.

4. The device of claim 1, wherein the processing circuitry is further configured to establish communication with an input device, wherein the processing circuitry is configured to receive a setpoint for a pressure threshold from the input device.

5. The device of claim 1, wherein the processing circuitry is further configured to control the operation of the respective one of the combustion chamber of the furnace or the combustion chamber of the water heater or boiler based on a pressure value of the pressure output satisfying a pressure threshold.

6. The device of claim 5, further comprising an operational amplifier configured to:
receive the pressure signal;
amplify the pressure signal; and
output the amplified pressure signal to the processing circuitry;
wherein to control the respective one of the combustion chamber of the furnace or the combustion chamber of the water heater or boiler the processing circuitry comprises a comparator configured to:
receive the amplified pressure signal from the operational amplifier;
compare the amplified pressure signal to a pressure threshold setpoint corresponding to the pressure threshold;
determine whether the pressure output satisfies the pressure threshold based on the comparison; and
in response to the pressure output satisfying the pressure threshold, output the control signal.

7. The device of claim 1, wherein the control signal comprises a switch control signal to operate a gas valve switch, and
wherein the gas valve is configured to open to allow flammable gas to enter the respective one of the combustion chamber of the furnace or the combustion chamber of the water heater or boiler based on the operation of the gas valve switch.

8. The device of claim 7, wherein the processing circuitry, the pressure sensor, and the switch are mounted on a first circuit board, wherein the first circuit board is configured to electrically connect to an integrated furnace controller (IFC).

9. The device of claim 1, wherein the inducer fan is configured to provide combustion air to the combustion chamber of the water heater and the gas valve is configured to provide flammable gas to heat water in the water heater.

10. A method comprising:
receiving, by processing circuitry, a signal from a pressure sensor in pneumatic communication with a pressure output of an inducer fan, wherein the signal from the pressure sensor indicates a dynamic range of pressure values of the pressure output of the inducer fan, wherein the inducer fan is configured to provide combustion air to at least one of a combustion chamber of a furnace or a combustion chamber of a water heater or boiler;
determining, by the processing circuitry, a magnitude of a pressure value in the range of pressure values of the pressure output of the inducer fan;
determining, by the processing circuitry, an operating state of the inducer fan based on the determined magnitude of the pressure value; and
controlling, by the processing circuitry, operation of a respective one of the combustion chamber of the furnace or the combustion chamber of the water heater or boiler, based on the determined magnitude of the pressure value, wherein controlling operation of the respective one of the combustion chamber of the furnace or the combustion chamber of the water heater or boiler comprises controlling a gas valve to open.

11. The method of claim 10, wherein controlling the gas valve comprises:
comparing the determined magnitude of a pressure value to a pressure threshold; and
controlling the operation of the respective one of the combustion chamber of the furnace or the combustion chamber of the water heater or boiler based on the pressure value of the pressure output satisfying a pressure threshold.

12. The method of claim 10, wherein controlling the gas valve to open comprises outputting, by the processing circuitry, a switch control signal to operate a gas valve switch, wherein the gas valve is configured to operate to allow flammable gas to enter the respective one of the combustion chamber of the furnace or the combustion chamber of the water heater or boiler based on the operation of the gas valve switch.

13. The method of claim 10 further comprising:
storing data comprising the range of the pressure values for the inducer fan at a memory location, and
outputting diagnostic and preventative maintenance information based on the stored data.

14. The method of claim 10, wherein controlling operation of the respective one of the combustion chamber of the furnace or the combustion chamber of the water heater or boiler comprises controlling the inducer fan to run at a second speed different from a first speed based on the determined magnitude of the pressure value.

15. A system comprising:
an inducer fan configured to provide combustion air to a combustion chamber,
wherein the inducer fan is configured to provide combustion air to at least one of a combustion chamber of a furnace or a combustion chamber of a water heater or boiler;
a pressure sensor in fluid communication with the combustion air and configured to measure pressure of the combustion air and to output a pressure signal indicating a dynamic range of values of the measured pressure; and
processing circuitry in signal communication with the pressure sensor,
wherein the processing circuitry is configured to:
receive the pressure signal from the pressure sensor;
determine the pressure output of the inducer fan based on a determined pressure value of the range of pressure values;
determine an operating state of the inducer fan based on the pressure signal from the pressure sensor; and
in response to determining the operating state of the inducer fan, output a control signal to control operation of a respective one of the combustion chamber of the furnace or the combustion chamber of the water heater or boiler, wherein to control the operation of the respective one of the combustion chamber of the furnace or the combustion chamber of the water heater or boiler, the control signal causes a gas valve to open.

16. The system of claim 15, wherein the processing circuitry is further configured to:
store data at a memory location, the data comprising the pressure output of the inducer fan, and
output diagnostic and preventative maintenance information based on the stored data.

17. The system of claim 16, wherein the processing circuitry outputs the diagnostic and preventative maintenance information via wireless communication.

18. The system of claim 15, further comprising an input device,
wherein the processing circuitry is configured to establish communication with the input device, and
wherein the processing circuitry is configured to receive a setpoint for a pressure threshold from the input device.

19. The system of claim 15, wherein the inducer fan is configured to provide combustion air to the combustion chamber of the water heater and the gas valve is configured to provide flammable gas to heat water in the water heater.

20. The system of claim 15, wherein the processing circuitry and the pressure sensor, are configured to be mounted on a daughter board, wherein the daughter board is configured to electrically connect to an integrated furnace controller.

* * * * *